(12) United States Patent
Duron et al.

(10) Patent No.: US 8,650,330 B2
(45) Date of Patent: Feb. 11, 2014

(54) SELF-TUNING INPUT OUTPUT DEVICE

(75) Inventors: Mike Conrad Duron, Austin, TX (US); Mark David McLaughlin, Austin, TX (US); James Earl Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 12/723,621

(22) Filed: Mar. 12, 2010

(65) Prior Publication Data

US 2011/0225323 A1 Sep. 15, 2011

(51) Int. Cl.
*G06F 3/00* (2006.01)

(52) U.S. Cl.
USPC .......................................................... 710/8

(58) Field of Classification Search
USPC .......................................................... 710/8
See application file for complete search history.

(56) References Cited

U.S. PATENT DOCUMENTS

| | | | |
|---|---|---|---|
| 6,058,450 A | 5/2000 | LaBerge et al. | |
| 6,223,218 B1 * | 4/2001 | Iijima et al. | 709/221 |
| 6,425,024 B1 | 7/2002 | Kelley et al. | |
| RE37,980 E | 2/2003 | Elkhoury et al. | |
| 6,546,447 B1 | 4/2003 | Buckland et al. | |
| 6,968,418 B2 | 11/2005 | Wollbrink et al. | |
| 7,155,534 B1 * | 12/2006 | Meseck et al. | 709/238 |
| 7,478,147 B2 | 1/2009 | Sharma et al. | |

OTHER PUBLICATIONS

IPCOM000135416, Method to Detect Optimal I/O Transfer Size to Enhance Data Transfer Efficiency, Apr. 14, 2006.

* cited by examiner

*Primary Examiner* — Henry Tsai
*Assistant Examiner* — Juanito Borromeo
(74) *Attorney, Agent, or Firm* — Garg Law Firm, PLLC; Rakesh Garg; Libby Z. Toub

(57) ABSTRACT

A method, system, and computer usable program product for a self-tuning I/O device are provided in the illustrative embodiments. A change is detected in an adapter communicating with the I/O device, the I/O device being a consolidator configured to communicate with the adapter in a data network. A type of the adapter is determined. Values for each parameter in a set of parameters corresponding to the type of the adapter are determined. The values of a first subset of the parameters are applied to the consolidator, applying the values of the first subset causing the consolidator to be configured to operate in a preferred configuration with the adapter.

20 Claims, 5 Drawing Sheets

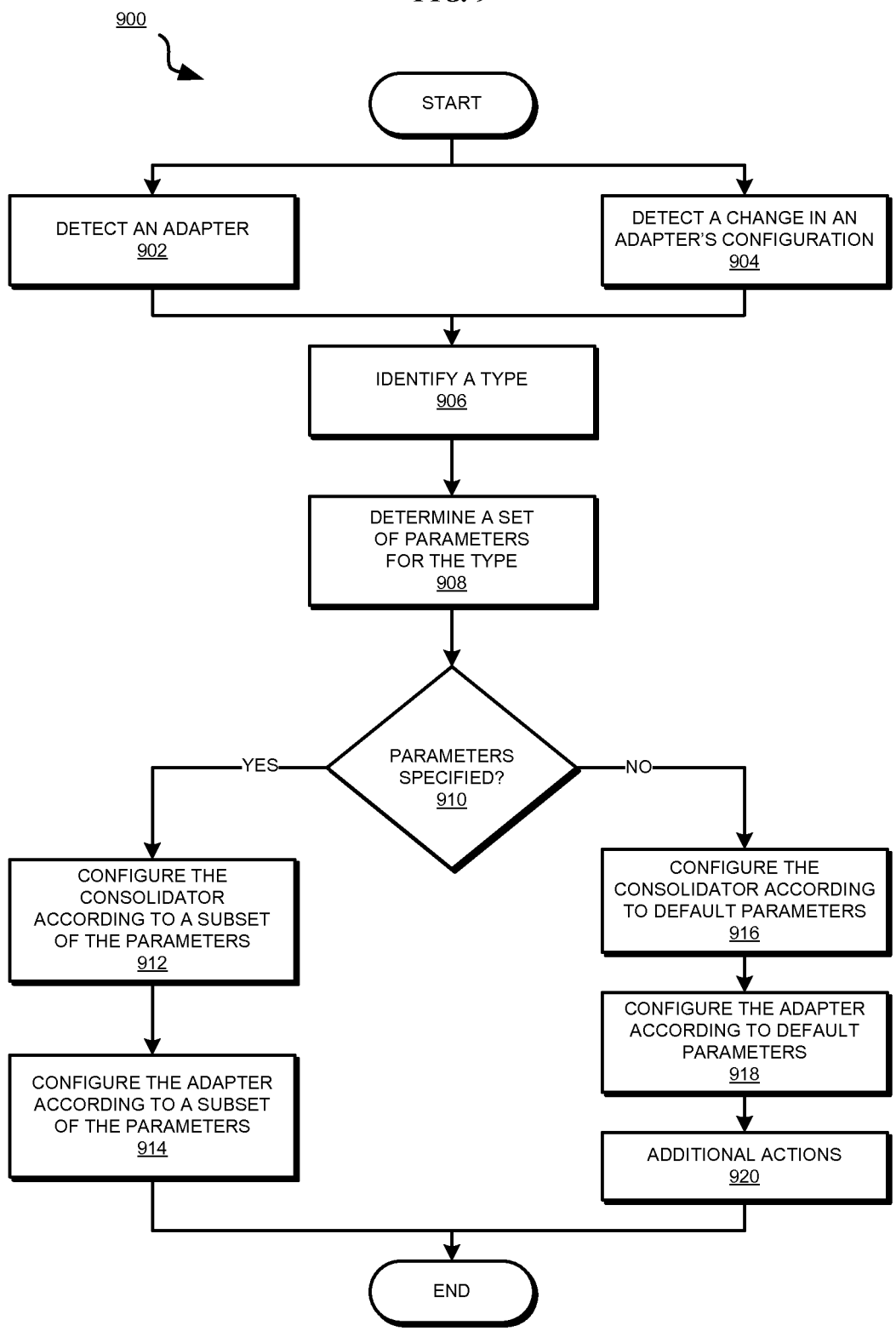

SELF-TUNING INPUT OUTPUT DEVICE

BACKGROUND OF THE INVENTION

1. Field of the Invention

The present invention relates generally to an improved data processing system, and in particular, to a computer implemented method for improving data communication. Still more particularly, the present invention relates to a computer implemented method, system, and computer usable program code for a self-tuning input output (I/O) device.

2. Description of the Related Art

Computers use I/O devices to communicate with other computers, data networks, data storage devices, and many other types of data processing systems. Typically, an I/O device is known as an I/O adapter, or simply as an adapter.

In some instances, IO adapters communicate with other devices that consolidate or facilitate data communication across numerous I/O adapters. For example, a hub is one example of a consolidator device that allows several adapters and associated data processing systems to communicate over a common link to a data network.

A bridge device is another example of a consolidator device that can be used to establish communications between two networks, such as a local area network (LAN) and a wide area network (WAN). A bridge can perform the functions of a hub with additional data communication facilitation features.

Switches, repeaters, routers, disk I/O consolidators are some more examples of consolidator devices. Essentially, a consolidator device operates to facilitate data communication between one or more adapters and a data network.

More than one adapter may exist in a given data processing environment. Some adapters may communicate with a data network via a consolidator device, whereas some other adapters may communicate with a data network directly. Some other adapters still may communicate with a data network via other adapters or data processing systems.

For example, a virtual adapter is a software representation of a physical adapter. The virtual adapter communicates with the corresponding physical adapter, which in turn communicates with a consolidator device to communicate with a data network.

SUMMARY OF THE INVENTION

The illustrative embodiments provide a method, system, and computer usable program product for a self-tuning input output (I/O) device. An embodiment detects a change in an adapter communicating with the I/O device. The I/O device may be a consolidator configured to communicate with the adapter in a data network. The embodiment determines a type of the adapter. The embodiment also determines values for each parameter in a set of parameters corresponding to the type of the adapter. The embodiment applies the values of a first subset of the parameters to the consolidator. Applying the values of the first subset causes the consolidator to be configured to operate in a preferred configuration with the adapter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 depicts a flowchart of a process of self-tuning an I/O device in accordance with an illustrative embodiment.

DETAILED DESCRIPTION OF THE PREFERRED EMBODIMENT

Figure 1:
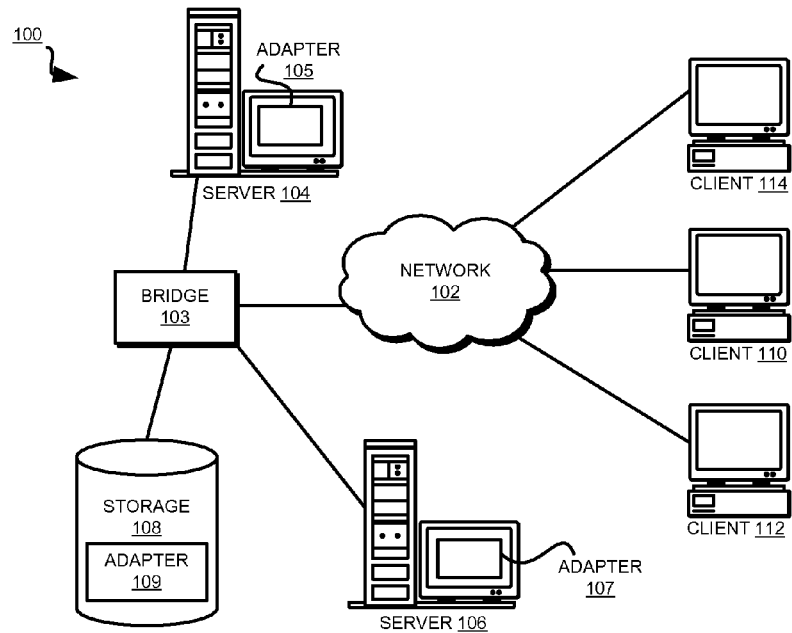
FIG. 1 depicts a pictorial representation of a network of data processing systems in which illustrative embodiments may be implemented.

The invention recognizes that a consolidator device, for example, a hub or a bridge, can be tuned to perform in a desirable manner under a given configuration. For example, the invention recognizes that given a type of data traffic, types of adapters in communication with the consolidator device, and other factors, certain configuration of a consolidator device may be more desirable than another configuration.

The invention further recognizes that a configuration of a consolidator device may include configuring not just the consolidator device but also one or more adapters in communication with the consolidator device. For example, a set of parameters associated with a consolidator device may be assigned certain values to place the consolidator device in a desirable configuration. A set of parameters is one or more parameters.

Presently, the parameters associated with a consolidator device are preset, or set according to a predefined consolidator-adapter configuration. Furthermore, presently, the setting of the parameters is a one-time operation, generally when the consolidator device is initialized. As additional or different adapters communicate with the consolidator device, the consolidator parameters are not reconfigured to perform in a desirable manner with the updated consolidator-adapter configuration.

Furthermore, presently, the configuration is often pre-written into firmware associated with a consolidator device. In complex data processing systems, such firmware can become sizable and complex. Accordingly, such firmware is difficult to code, modify, and load. Such firmware also occupies a significant portion of the memory used by the consolidator.

The invention recognizes that allowing the consolidator to determine aspects of the adapters with which the consolidator communicates may cause the consolidator to configure itself in a preferable manner. The invention further recognizes that this discovery of the connected adapters may offer an improved performance of the consolidator due to this preferable configuration.

The invention further recognizes that an adapter associated with a consolidator may change during the operation of the consolidator-adapter configuration. For example, a new adapter may be placed in communication with the consolidator. As another example, an adapter already in communication with the consolidator device may change one of the functions. For example, an adapter capable of operating on two types of networks may switch from one network to another.

As another example, an adapter may be reconfigured during operation to operate differently. For example, an adapter may have been operating as a primary adapter for a data processing system, and while so operating, may be transitioned to a secondary role, causing the adapter to handle less data traffic.

The illustrative embodiments used to describe the invention generally address and solve the above-described problems and other problems related to data I/O. The illustrative embodiments provide a method, computer usable program product, and data processing system for a self-tuning I/O device.

A consolidator or consolidator device according to an embodiment may be a hardware device, a software application, or firmware. The invention recognizes that adjusting the consolidator device's parameters dynamically, to wit, while in operation, and may further advantageously reconfigure the consolidator device to perform in a desirable manner when the associated adapters change. The discovery of adapters and dynamic adjustment of consolidator parameters are some of the features included in some of the embodiments described herein.

The invention further recognizes that a set of parameters may also be associated with an adapter that communicates with the consolidator device. In conjunction with, or instead of assigning values to the set of parameters of the consolidator device, some parameters of the adapters may also be configured to form a desirable configuration of the adapter-consolidator combination. Some embodiments described herein may adjust the adapter parameters to reconfigure the adapter to operate in a preferable manner with the consolidator device.

The embodiments of the inventions may further allow a data processing environment to implement changes to a data communication infrastructure without having to experience deteriorated performance due to an undesirable configuration of consolidator devices, adapters, or both. A data processing environment using an embodiment may make a change in the data communication infrastructure and the embodiment may adjust parameters of the consolidator-adapter configuration to values desirable for the changed infrastructure.

The illustrative embodiments are described with respect to data, data structures, and identifiers only as examples. Such descriptions are not intended to be limiting on the invention. For example, an illustrative embodiment described with respect to an onboard register may be implemented using any type of memory located anywhere in a similar manner within the scope of the invention.

Furthermore, the illustrative embodiments may be implemented with respect to any type of data processing system. For example, an illustrative embodiment described with respect to an adapter in a standalone data processing system may be implemented with physical or virtual adapters in a multiprocessor logical partition system within the scope of the invention.

The illustrative embodiments are further described with respect to certain parameters, attributes, and configurations only as examples. Such descriptions are not intended to be limiting on the invention.

An embodiment of the invention may be implemented with respect to any type of data processing system. For example, an embodiment may be implemented with any type of client system, server system, platform, or a combination thereof.

An application implementing an embodiment may take the form of data, data objects, code objects, encapsulated instructions, application fragments, services, and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
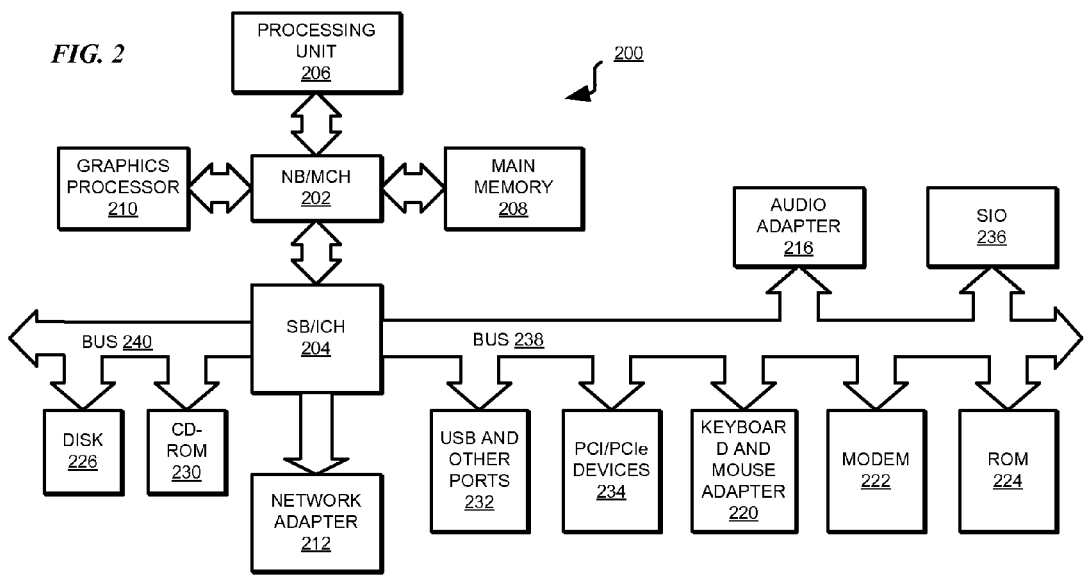
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

As an example, server 104 may include adapter 105. Server 106 may include adapter 107. Storage 108 may include adapter 109. Using their respective adapters, server 104, server 106, and storage 108 may communicate with network 102 via a consolidator device, such as bridge 103.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
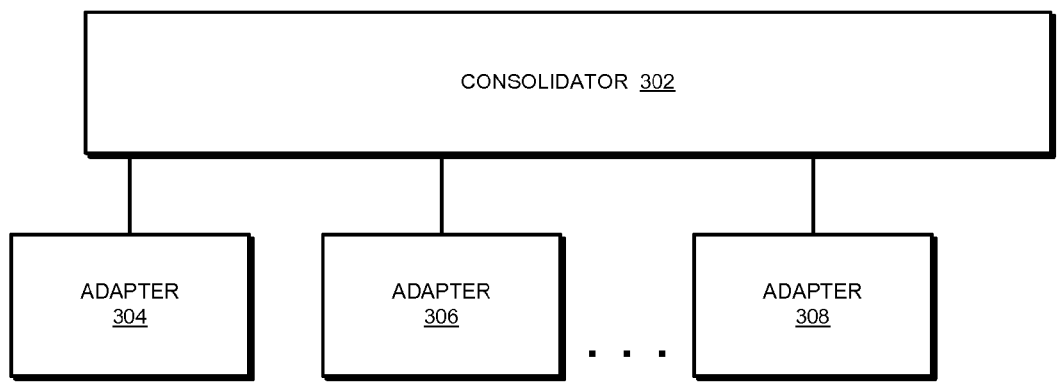
FIG. 3 depicts a block diagram of a consolidator-adapter configuration with respect to which an illustrative embodiment can be implemented.

With reference to FIG. 3, this figure depicts a block diagram of a consolidator-adapter configuration with respect to which an illustrative embodiment can be implemented. Configuration 300 includes consolidator 302. Consolidator 302 may be any type of consolidator device, such as a bridge similar to bridge 103 in FIG. 1.

Adapters 304, 306, and 308 may be any type of adapter operable with consolidator 302. Furthermore, any number of adapters similar to any of adapter 304, 306, and 308 may be configured in configuration 300 within the scope of the invention.

For example, in one embodiment, consolidator 302 may be an Ethernet router. Accordingly, adapters 304-308 may each be a network adapter of any type. For example, adapter 304 may be an Ethernet adapter coupled to consolidator 302 over an Ethernet cable. Adapter 306 may be a wireless adapter coupled with consolidator 302 over a wireless radio channel. Adapter 308 may be an access point device capable of identifying itself as a wireless network adapter to consolidator 302 and performing wireless network distribution to other adapters.

Some adapters, such as those designed according to PCI specification, include a parameter called "class." A class, or class code, of an adapter is a type associated with the adapter, identifying a primary function for which the adapter is suitable. For example, an adapter, such as adapter 304, may be of "communication" class. Adapter 304 may have been designed for data communication for a data processing system as a primary function.

As another example, adapter 306 may be of "storage" class. Adapter 306 may have been designed to operate in conjunction with a data storage device.

Many other classes of adapters can be similarly specified. For example, an adapter class may indicate that the adapter is associated with a mass storage controller, network controller, display controller, multimedia device, memory controller, bridge device, simple communications controller, base system peripheral, input device, docking station, processor, or a serial bus controller.

Furthermore, the class parameter is only one example of an adapter parameter that identifies a characteristic of the adapter. Adapters designed according to another specification may similarly identify a primary functionality or other characteristics in other ways.

Other adapter parameters may inform additional characteristics of an adapter. For example, a parameter may inform about a data rate at which the adapter is configured to operate. Another example parameter may identify a set of network protocols supported by the adapter. Another example parameter of an adapter may specify whether the adapter provides power over Ethernet (PoE).

Figure 4:
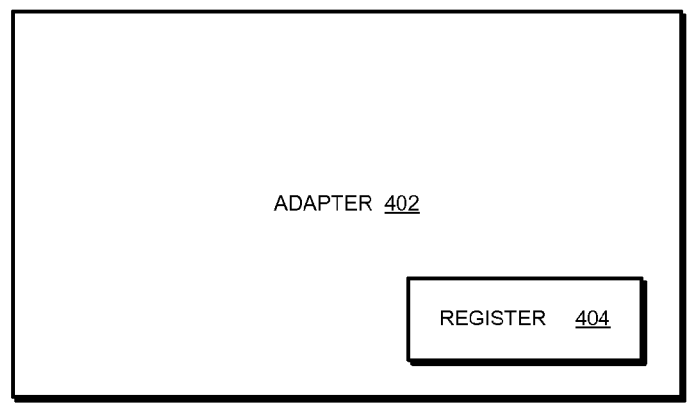
FIG. 4 depicts an example configuration of an adapter with respect to which an illustrative embodiment can be implemented.

With reference to FIG. 4, this figure depicts an example configuration of an adapter with respect to which an illustrative embodiment can be implemented. A parameter associated with an adapter may be stored anywhere in the data processing system. In the example adapter, adapter 402, onboard register 404 may hold a parameter. More than one register 404 may hold a set of parameters. For example, register 404 may hold the class parameter associated with adapter 402. Querying register 404 may reveal the class of adapter 402.

Continuing with the class parameter as an example, the class parameter may be an indication of a desirable configuration of adapter 402, or a consolidator operating therewith. For example, a storage class adapter 402 may operate with improved efficiency if the adapter sends or receives longer than a threshold size of data packet stream. A consolidator, such as consolidator 302 in FIG. 3, operating with storage class adapter 402 may have to manage such packet streams in the consolidator's queuing space. Accordingly, the consolidator should be configured with a larger than a threshold size of queuing space to manage the packet streams of storage class adapter 402.

As another example, a communication class adapter 402 may operate with improved efficiency if the adapter sends or receives shorter than a threshold size of data transmission. A consolidator, such as consolidator 302 in FIG. 3, operating with communication class adapter 402 may have to manage such transmissions in the consolidator's buffer space. Accordingly, the consolidator should be configured with a larger than a threshold size of buffering space to manage the short but numerous transmissions of communication class adapter 402.

Figure 5:
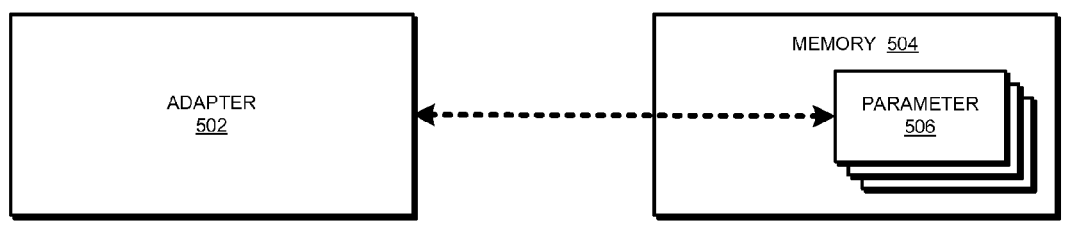
FIG. 5 depicts a block diagram of another example adapter configuration with respect to which an illustrative embodiment can be implemented.

With reference to FIG. 5, this figure depicts a block diagram of another example adapter configuration with respect to which an illustrative embodiment can be implemented. A parameter associated with an adapter may be stored anywhere in the data processing system.

In the example adapter, adapter 502, memory 504 may hold parameter 506. Parameter 506 may be a set of parameters. For example, a location in memory 504 may hold the class parameter associated with adapter 502. In one embodiment, a set of parameters associated with adapter 502 may be distributed across several instances of memory 504, including one or more registers onboard adapter 502.

Figure 6:
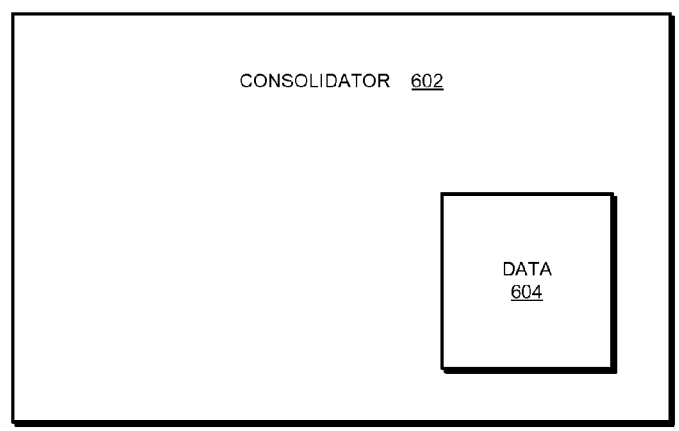
FIG. 6 depicts a block diagram of a consolidator configuration in accordance with an illustrative embodiment.

With reference to FIG. 6, this figure depicts a block diagram of a consolidator configuration in accordance with an illustrative embodiment. Consolidator 602 may be similar to consolidator 302 in FIG. 3. Consolidator 602 may be used in conjunction with any type and number of adapters, such as adapters 402 in FIG. 4 and 502 in FIG. 5.

Consolidator 602 may use data 604 for self tuning a consolidator-adapter configuration in accordance with an illustrative embodiment. For example, in one embodiment, data 604 may be a table. The table may store one or more rows of data, a row of data pertaining to a type of adapter that can communicate with consolidator 602. A column in each row of the table may store a type associated with an adapter, such as a class of an adapter. A set of columns in each row may store desirable values of certain parameters of consolidator 602. Another set of columns may store desirable values of certain parameters of the adapter whose type appears in one of the columns.

Not all rows may have all the columns occupied. For example, a particular parameter of consolidator 602 may not be used for a specific type of adapter. Accordingly, the row that specifies that type of adapter may leave the column of that unused parameter blank, null, void, or set to a default value.

Similarly, not all parameters of adapters may be applicable to all types of adapters. Accordingly a column corresponding to a parameter of an adapter that does not apply to a particular adapter type may be left blank, null, void, or set to a default value.

Furthermore, a common adapter type may appear in more than one row in the table of data 604. For example, two alternate values of a particular parameter of a given adapter type may be desirable under different conditions. Accordingly, a first row for that adapter type may specify a first set of values of parameters for consolidator 602. A second row for that adapter type may specify a second set of values of parameters for consolidator 602. Generally, within the scope of the invention, any adapter type can appear in any number of rows with the values in some of the other columns in those rows being different.

Additionally, data 604 is shown to be within or onboard consolidator 602 only as one example embodiment. Data 604 can be located anywhere in a data processing environment, such that data 604 is accessible to consolidator 602.

Figure 7:
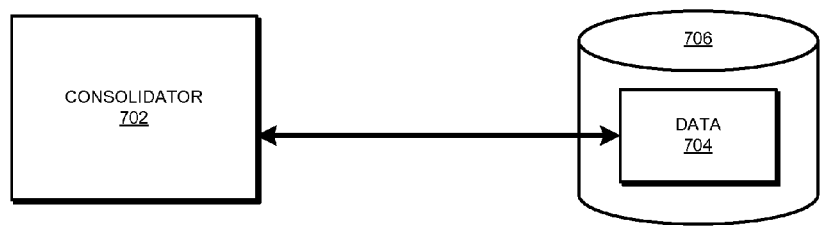
FIG. 7 depicts another example configuration of a consolidator in accordance with an illustrative embodiment.

With reference to FIG. 7, this figure depicts another example configuration of a consolidator in accordance with an illustrative embodiment. Consolidator 702 may be similar to consolidator 602 in FIG. 6. Data 704 may be similar to data 604 in FIG. 6.

As depicted in this embodiment, data 704 may be located in data storage 706. Consolidator 702 may access data 704 over a data network including but not limited to LAN, WAN, or a system bus of any type.

Data storage 706 may be any form of data storage device, such as a memory or a hard disk drive. Data storage 706 may be any type of data storage application, such as a file or a database.

Figure 8:
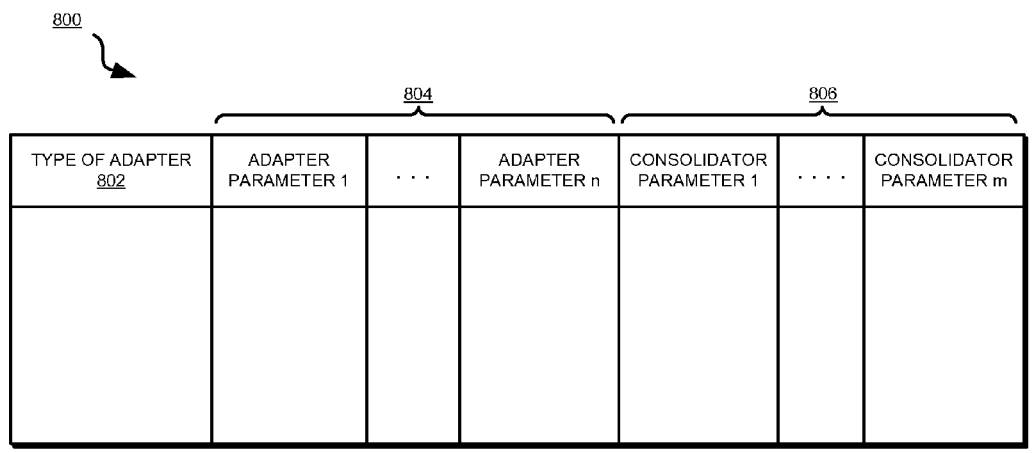
FIG. 8 depicts an example table in which configuration data may be stored in accordance with an illustrative embodiment.

With reference to FIG. 8, this figure depicts an example table in which configuration data may be stored in accordance with an illustrative embodiment. Table 800 may be used as data 604 in FIG. 6 or 704 in FIG. 7.

As an example, table 800 is depicted as including column 802, which may be used to store the type information of various adapters. Columns 804 may be any number of columns and may be used to store any number of adapter parameters. Columns 806 may be any number of columns and may be used to store any number of consolidator parameters.

The order, name, type, or number of columns is not a limitation on the invention. Table 800 is depicted only as an example organization of the configuration data. An embodiment may store similar configuration data in any form suitable to that implementation within the scope of the invention. For example, table 800 may take the form of a file, contents of a set of registers or memory locations, or any data structure.

Using the configuration data in data 604 in FIG. 6, data 704 in FIG. 7, or table 800 in FIG. 8, a consolidator device according to an embodiment can self-tune the performance of the consolidator-adapter configuration. For example, upon detecting a new adapter, a consolidator according to an embodiment can look up such configuration data, determine and apply desirable settings for a subset of consolidator parameters, subset of existing adapters' parameters, subset of newly added adapter's parameters, or a combination thereof.

As another example, upon detecting a change in an adapter, such as a change of primary function of the adapter, a consolidator according to an embodiment may take similar actions. As another example, when an adapter is removed from the consolidator-adapter configuration, a consolidator according to an embodiment can determine and apply desirable settings for a subset of consolidator parameters, subset of remaining adapters' parameters, or a combination thereof.

Furthermore, a consolidator device according to an embodiment can perform the determination and application of desirable parameter values while the consolidator-adapter configuration is operational. In other words, changes to a consolidator-adapter configuration made while such configuration is in operation may alter the desirable characteristics of the configuration. A consolidator according to an embodiment may make changes to one or more parameters such that desirable operation of the configuration is resumed without interrupting the configuration's operation.

With reference to FIG. 9, this figure depicts a flowchart of a process of self-tuning an I/O device in accordance with an illustrative embodiment. Process 900 may be implemented in a consolidator, such as consolidator 702 in FIG. 7.

Process 900 begins by either detecting an adapter (step 902), or detecting a change in an adapter's configuration (step 904). Process 900 determines a type of the adapter being added or changed (step 906).

Process 900 determines a set of parameters for the type (step 908). For example, process 900 may look up a table, such as table 800 in FIG. 8, and identify one or more rows. Furthermore, in performing step 908, process 900 may take into consideration other factors, such as a present data traffic rate, a historical data traffic rate under similar conditions, a system policy, an event or condition in the data processing environment, or specific factors or conditions associated with an adapter.

A data traffic rate is a volume of data being moved in a defined period. An example of an event may be a notification in the data processing system that an adapter is going to be shut down at a defined time. An example factor or condition of an adapter may be that a PoE enabled adapter is not supplying power at a given time.

An example system policy may require that at any given time at least three adapters have to be configured to share data traffic load equally for a data processing system. Accordingly, a configuration of a consolidator may change to award equal data load to the three adapters regardless of a specification to the contrary in one of the adapter's parameters. Many other considerations for performance and other situations will become apparent from this disclosure based on which the set of parameters may be determined in step 908. Such additional considerations are contemplated within the scope of the invention.

Process 900 may determine whether the parameters are specified for the given adapter, change in an adapter, or a configuration consideration (step 910). If parameters are specified ("Yes" path of step 910), process 900 may configure the consolidator of an embodiment according to a subset of the parameters (step 912). In an embodiment, process 900 may also configure the new or changed adapter according to another subset of parameters (step 914). Process 900 may end thereafter. In another embodiment, step 914 may be omitted and process 900 may end after step 912.

If parameters are not specified ("No" path of step 910), process 900 may configure the consolidator of an embodiment according to default values for a subset of the parameters (step 916). In an embodiment, process 900 may also configure the new or changed adapter according to default values for another subset of parameters (step 918). In another embodiment, step 918 may be omitted.

Process 900 may perform additional actions (step 920). For example, process 900 may notify an administrator about the missing values of certain parameters for the encountered configuration. As another example, process 900 may compute desirable values for those parameters or cause them to be computed in step 920. Process 900 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for a self-tuning I/O device. Using the embodiments of the invention, a data processing environment can operate with improved data communication efficiency when using adapters and a consolidator. Using an embodiment, a data processing system or an application can detect a change in the data communication infrastructure, determine desirable performance parameters for the components of the infrastructure and self-tune the infrastructure to achieve that desirable performance.

An embodiment of the invention may be applied to other device configurations including but not limited to I/O devices. For example, an embodiment can be applied to storage device controllers to self-tune device configurations for different types of disk traffic in the manner described in this disclosure.

An embodiment is similarly usable when the nature of an adapter changes. For example, an embodiment may be applicable when a communication adapter is changed from being attached to a LAN to being attached to a storage area network (SAN).

An embodiment is applicable to virtual devices just as the embodiment is applicable to physical devices. For example, if a virtual SCSI or Ethernet adapter is configured with the expectation of a certain type of traffic, the virtual adapter can be assigned a class code just as a physical adapter and parameters associated with that class of adapters can be added to the configuration data used by a consolidator.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for a self-tuning input output (I/O) device, the computer implemented method comprising:
    detecting a change in an adapter communicating with the I/O device, the I/O device being a consolidator configured to facilitate data communication between a plurality of adapters and a data network, the plurality of adapters including the adapter;
    determining a type of the adapter;
    determining values for each parameter in a set of parameters corresponding to the type of the adapter; and
    applying the values of a first subset of the parameters to the consolidator, applying the values of the first subset causing the consolidator to be configured to operate in a preferred configuration with the adapter.

2. The computer implemented method of claim 1, wherein detecting, determining the type, determining the values, and applying occur while the consolidator is operational.

3. The computer implemented method of claim 1, further comprising:
    applying the values of a second subset of the parameters to the adapter, applying the values of the second subset causing the adapter to be configured to operate in a preferred configuration with the consolidator.

4. The computer implemented method of claim 1, wherein the set of parameters is one of several sets of parameters identifiable by the type of adapter, and the set of parameters is selected from the several sets using a configuration consideration.

5. The computer implemented method of claim 4, wherein the configuration consideration is a present data traffic rate.

6. The computer implemented method of claim 1, wherein the set of parameters are one of (i) stored in the consolidator, and (ii) stored in a data storage accessible to the consolidator over the data network.

7. The computer implemented method of claim 1, wherein the type of the adapter is a class code of the adapter.

8. A computer usable program product comprising a computer usable storage device including computer usable code for a self-tuning input output (I/O) device, the computer usable code comprising:

computer usable code for detecting a change in an adapter communicating with the I/O device, the I/O device being a consolidator configured to facilitate data communication between a plurality of adapters and a data network, the plurality of adapters including the adapter;

computer usable code for determining a type of the adapter;

computer usable code for determining values for each parameter in a set of parameters corresponding to the type of the adapter; and computer usable code for applying the values of a first subset of the parameters to the consolidator, applying the values of the first subset causing the consolidator to be configured to operate in a preferred configuration with the adapter.

9. The computer usable program product of claim 8, wherein detecting, determining the type, determining the values, and applying occur while the consolidator is operational.

10. The computer usable program product of claim 8, further comprising:

computer usable code for applying the values of a second subset of the parameters to the adapter, applying the values of the second subset causing the adapter to be configured to operate in a preferred configuration with the consolidator.

11. The computer usable program product of claim 8, wherein the set of parameters is one of several sets of parameters identifiable by the type of adapter, and the set of parameters is selected from the several sets using a configuration consideration.

12. The computer usable program product of claim 11, wherein the configuration consideration is a present data traffic rate.

13. The computer usable program product of claim 8, wherein the set of parameters are one of (i) stored in the consolidator, and (ii) stored in a data storage accessible to the consolidator over the data network.

14. The computer usable program product of claim 8, wherein the type of the adapter is a class code of the adapter.

15. The computer usable program product of claim 8, wherein the computer usable code is stored in a computer readable storage medium in a data processing system, and wherein the computer usable code is transferred over a network from a remote data processing system.

16. The computer usable program product of claim 8, wherein the computer usable code is stored in a computer readable storage medium in a server data processing system, and wherein the computer usable code is downloaded over a network to a remote data processing system for use in a computer readable storage medium associated with the remote data processing system.

17. A data processing system for a self-tuning input output (I/O) device, the data processing system comprising:

a storage device including a storage medium, wherein the storage device stores computer usable program code; and a processor, wherein the processor executes the computer usable program code, and wherein the computer usable program code comprises:

computer usable code for detecting a change in an adapter communicating with the I/O device, the I/O device being a consolidator configured to facilitate data communication between a plurality of adapters and a data network, the plurality of adapters including the adapter;

computer usable code for determining a type of the adapter;

computer usable code for determining values for each parameter in a set of parameters corresponding to the type of the adapter; and computer usable code for applying the values of a first subset of the parameters to the consolidator, applying the values of the first subset causing the consolidator to be configured to operate in a preferred configuration with the adapter.

18. The data processing system of claim 17, wherein detecting, determining the type, determining the values, and applying occur while the consolidator is operational.

19. The data processing system of claim 17, further comprising:

computer usable code for applying the values of a second subset of the parameters to the adapter, applying the values of the second subset causing the adapter to be configured to operate in a preferred configuration with the consolidator.

20. The data processing system of claim 17, wherein the set of parameters is one of several sets of parameters identifiable by the type of adapter, and the set of parameters is selected from the several sets using a configuration consideration.

* * * * *